UNITED STATES PATENT OFFICE.

LOUIS E. BARTON, OF NIAGARA FALLS, NEW YORK, AND HENRY A. GARDNER, OF WASHINGTON, DISTRICT OF COLUMBIA, ASSIGNORS, BY MENSE ASSIGNMENTS, TO TITANIUM PIGMENT COMPANY, INC., A CORPORATION OF MAINE.

PLASTIC.

1,365,882.  Specification of Letters Patent.  Patented Jan. 18, 1921.

No Drawing.   Application filed February 7, 1917.  Serial No. 147,113.

*To all whom it may concern:*

Be it known that we, LOUIS E. BARTON, a resident of Niagara Falls, in the State of New York, and HENRY A. GARDNER, residing in the city of Washington and District of Columbia, and being both citizens of the United States, have jointly invented certain new and useful Improvements in Plastics, of which the following is a specification.

Our present invention relates to that class of socalled "plastics" which are distinguishable, in their final solidified and commercially utilized state, as being relatively hard, brittle, or breakable, ultimately non-flowing, compacted bodies so dense as to be polishable; and, also, particularly distinguishable as consisting essentially of a homogeneous indurated composition product, or magma, formed, as is now well known, by aid of transformation, through inter-action upon each other, of co-assembled oxygen-containing organic matters, some of which are derived from cellulose. Their possession of this combination of specified characteristics and properties differentiates the plastics in question from other, at some stage, plastic compositions, such for example as paints, glass, rubber, etc. Types of the "plastics" referred to are celluloid and "bakelite".

Various well known solid articles are commonly manufactured from certain of these plastics respectively; for example, artificial ivory from celluloid, etc., and, in their manufacture, have been heretofore often compounded and incorporated with such plastics, various other, often inorganic, substances for purposes of coloration, durability, strength, etc.

The objects of our invention comprise provision of means whereby, at reduced cost of manufacture, are impartable, to products consisting preponderatingly of said plastics, better, or more desirable, properties than heretofore, such, for example, as greater whiteness, opacity, hardness, heat resistance, strength, durability, attractiveness of appearance, etc.

We attain these objects by our present invention, which is based on our discovery that certain hereinafter referred to titanic substances are, owing to their own peculiar properties, as well as those of the specified plastics, best adapted to improve the latter, and respective products of their admixture, as regards some or all of their above referred to properties.

Our invention is practised by adding to, and thoroughly and uniformly compounding and incorporating with, the organic materials usually employed in the production of the particular plastic to be improved for the purpose in hand and prior to the co-assemblage and transformation of the said materials, the titanic substance, and in such proportions, usually less than preponderating, as will be readily indicated to those skilled in the art by special requirements and purposes of each operation.

We thus use, as the titanic substance, or pigment, added, artificially concentrated titanic oxid, in such amorphous, substantially pure, fine, smooth, white to light buff in color, powdered forms as are obtainable by the aid of such procedures as are described in Letters Patent granted to Auguste J. Rossi and Louis E. Barton Nos. 1,106,406, 1,106,407, 1,106,408, 1,106,409, 1,106,410, dated August 11, 1914, No. 1,166,547, dated January 4, 1916, No. 1,171,542, dated February 15, 1916, and Nos. 1,196,029, 1,196,030 and 1,196,031, dated August 29, 1916; also, to Louis E. Barton No. 1,189,229, dated July 4, 1916, No. 1,201,541, dated October 17, 1917, and Nos. 1,206,796, 1,206,797, 1,206,798, dated December 5, 1916.

We also find it in many cases peculiarly advantageous and preferable to use what is now known as a "composite titanic oxid pigment" in which the said titanic oxid is in the form of very minute particles thereof in coalesced combination with, and adherent to, carrier particles of some other substance, usually a sulfate base, and preferably calcium sulfate, such, for example, as produced by precipitation of the said oxid upon such a substance while suspended in an acid solution, preferably a sulfuric acid solution, as per the procedures described in Letters Patent granted to Louis E. Barton, No. 1,155,462, dated October 5, 1915, or 1,205,144, dated November 21, 1916.

The titanic substance or composition thus employed we compound and incorporate with the other usual constituents of the plastic in any convenient manner adapted to insure a thorough and uniform mutual admixture thereof. For example, we thus make use of any of the well known procedures whereby so called "pigments" have hitherto been intermixed with such plastics. Thus the titanic substance may be mechanically admixed and compounded with the usual constituents of plastic while the latter are in a dry state, or the additions of titanic substance may be made to a solution of the said constituents which is, thereafter, as usual, spread, and by evaporation of the solvent, or otherwise, dried as a film on a suitable surface, or molded, or otherwise shaped, into the form of the desired article, as for example, a filament, etc.

By our said additions of a titanic pigment substance of the kind specified in quantity required, and the thorough incorporation thereof with the other constituents of one of the above mentioned plastics, say celluloid, for example, we are enabled to impart to the latter, or to the products therefrom manufactured, an opacity, and an intense whiteness of coloration hitherto, as we believe, unattainable. This we attribute in parts to the peculiar properties of our said titanic addition including its whiteness, smoothness, softness, and minuteness of subdivision, but especially to its index of refraction being greater than that of any other substances heretofore known to us as having been admixed with a plastic for coloration. If desired, we impart desired tints to the final products by adding and incorporating, with the titanic substance, such other tinting materials as may be desired.

The properties of the products, and articles produced by aid of our said invention, these comprising in preponderance the organic constituents, and a therewith admixed lesser content of the specified kind of titanic substance, will, in many respects, prove superior to analogous products heretofore obtained by aid of other admixtures, various types of our said products being, for instance, as we believe, more durable, heat resistant, harder, stronger, whiter and more attractive in general appearance, which seems attributable in part to some of our peculiar properties of the titanic additions above noted, and also to their exceptionally great stability when so compounded with the organic ingredients referred to.

We are aware that, prior to our invention, it has been suggested that certain crushed, or powdered, minerals, namely menaccanite, rutile, anatase, or brookite, containing natural oxids of titanium, be incorporated in paints containing such organic vehicles as oils, turpentine, pitch, or also in a non-corrosible plastic composition composed of asphalt or other hydrocarbon mixed with a preponderance of one or more of the said powdered titaniferous minerals, the color of which varies from a deep black to a dark reddish tint. None of this do we claim as constituting any part of our invention, which is, as appears from the foregoing, distinguishable therefrom in many respects, including particularly that of its application to the thus defined kind of plastics which are very different from ours in constituents, in properties, and also in the therein status of the materials from which compounded, these being in the former in a state of mechanical mixture and separable therefrom in their respective original forms and entities. Our invention is also distinguishable by our employment of a different kind of titanic addition, to-wit, a substantially pure titanic oxid concentrate, or pigment, of substantially white, or not darker than light buff, coloration, if otherwise negligible iron be present; and particularly in that the titanic oxid used by us is in amorphous, artificially produced, form, instead of the natural and crystalline form previously suggested, as aforesaid, and which our researches indicate to be useless for the purposes of our invention.

It will be understood that in the formation of our products the other usual constituents of our plastics behave as usual as regards formation therefrom of the usual homogeneous magma and as herein previously described, and that this magma serves as a matrix in which are contained the thereinto impregnated particles of our titanic additions.

Having now described our invention, what we claim as new and desire to secure by Letters Patent is the following, viz:

1. In the production of hard, dense, polishable plastics consisting pricipally of a homogeneous magma formed and indurated by aid of inter-action and resulting transformation of its from-cellulose-derived and other oxygen-containing organic constituents, the step which consists in incorporating with said constituents, prior to their said transformation, titanic oxid.

2. In the production of hard, dense, polishable plastics consisting principally of a homogeneous magma formed and indurated by aid of inter-action and resulting transformation of its from-cellulose-derived and other oxygen-containing organic constituents, the step which consists in incorporating with said constituents, prior to their said transformation, amorphous titanic oxid.

3. In the production of hard, dense, polishable plastics consisting principally of a homogeneous magma formed and indurated by aid of inter-action and resulting transformation of its from-cellulose-derived and other oxygen-containing organic constituents, the step which consists in incorporating with said constituents, prior to their said transformation, particles of alkaline earth sulfate having thereto adherent particles of amorphous titanic oxid.

4. In the production of hard, dense, polishable plastics consisting principally of a homogeneous magma formed and indurated by aid of inter-action and resulting transformation of its from-cellulose-derived and other oxygen-containing organic constituents, the step which consists in incorporating with said constituents, prior to their said transformation, particles of alkaline earth sulfate having thereto adherent titanic particles.

5. The method of producing a product containing celluloid which comprises compounding and incorporating with the constituents of such celluloid titanic oxid.

6. The method of producing a product containing celluloid, which comprises compounding and incorporating with the constituents of such celluloid particles of alkaline earth sulfate having thereto adherent particles of amorphous titanic oxid.

7. The method of producing a product containing celluloid which comprises compounding it and incorporating with the constituents of such celluloid particles of alkaline earth sulfate having thereto adherent titanic particles.

8. As a new article of manufacture, a hard, dense, polishable, plastic consisting principally of a homogeneous indurated composition-product of transformed from-cellulose-derived, and other, oxygen-containing organic matter and impregnated by particles of titanic oxid.

9. As a new article of manufacture, a hard, dense, polishable, plastic consisting principally of a homogeneous indurated composition-product of transformed from-cellulose-derived, and other, oxygen-containing organic matter and impregnated by particles of amorphous titanic oxid.

10. As a new article of manufacture, a hard, dense, polishable, plastic consisting principally of a homogeneous indurated composition-product of transformed from-cellulose-derived, and other, oxygen-containing organic matter and impregnated by particles of alkaline earth sulfate base having thereto adherent titanic particles.

11. As a new composition of matter celluloid having therewith incorporated titanic oxid.

12. As a new composition of matter, celluloid having therewith incorporated particles of alkaline earth sulfate having thereto adherent particles of amorphous titanic oxid.

13. As a new composition of matter, celluloid having therewith incorporated particles of titanic oxid in coalescence with, and adherent to, particles of alkaline earth sulfate.

14. A nitrocellulose composition containing titanium oxid.

15. A nitrocellulose composition containing titanium oxid and a volatile solvent.

16. A nitrocellulose plastic containing titanium oxid.

17. A nitrocellulose plastic containing titanium oxid and a volatile solvent.

18. A nitrocellulose plastic containing titanium oxid, camphor, and a volatile solvent.

19. A nitrocellulose composition containing titanium oxid and camphor.

LOUIS E. BARTON.
HENRY A. GARDNER.

Witnesses as to Louis E. Barton:
 RALPH S. TABOR,
 C. P. RUSIG.
Witnesses as to Henry A. Gardner:
 B. T. WEBSTER,
 B. I. SAXTON.